Dec. 14, 1937.  D. HOPPENSTAND  2,102,268
WINDSHIELD WIPER
Filed April 2, 1935  2 Sheets-Sheet 1
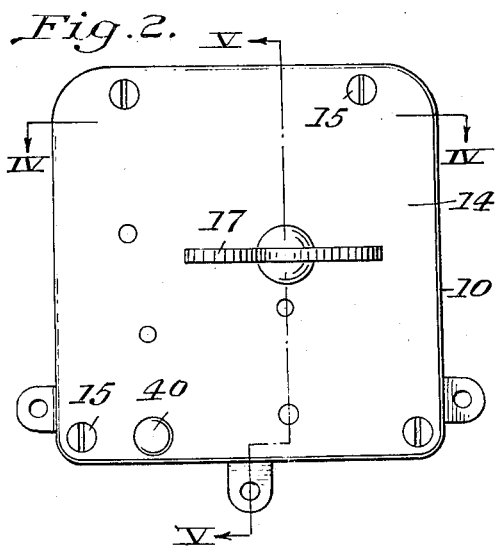
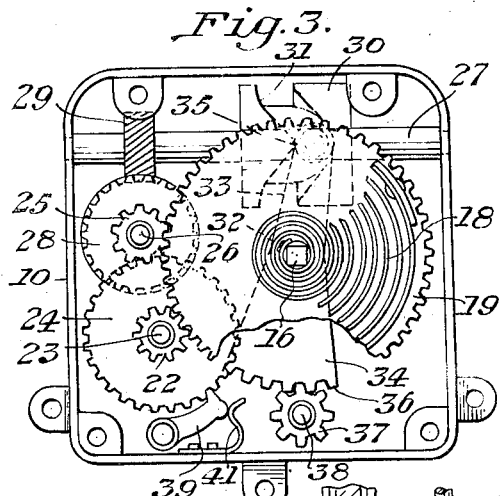
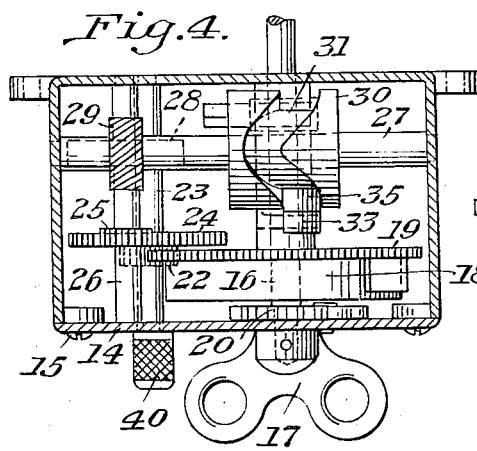
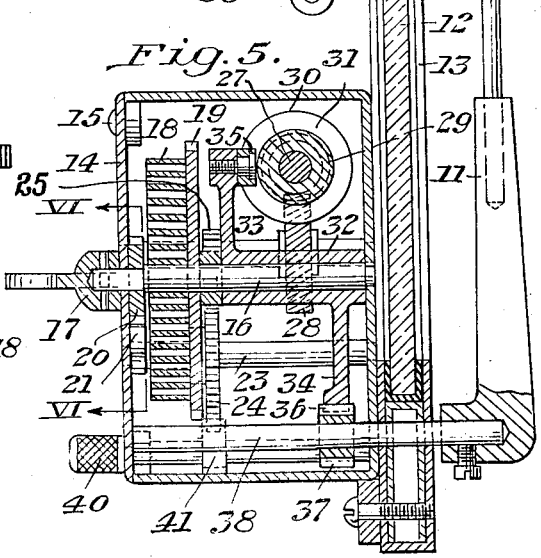
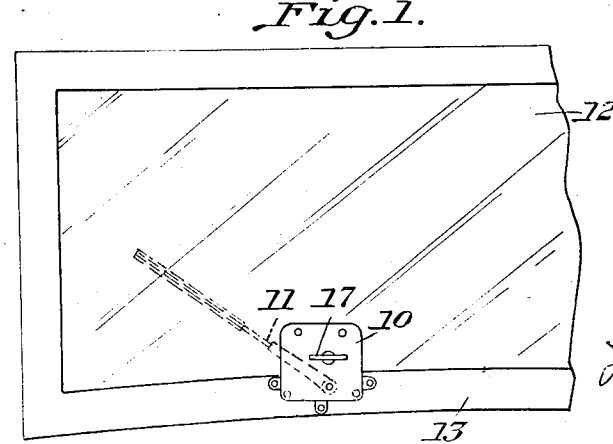
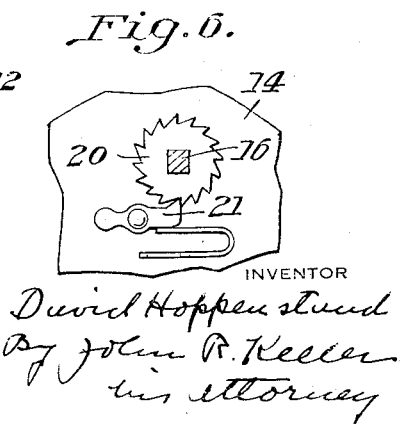
INVENTOR
David Hoppenstand
By John R. Keller
his Attorney Dec. 14, 1937.  D. HOPPENSTAND  2,102,268
WINDSHIELD WIPER
Filed April 2, 1935  2 Sheets-Sheet 2

INVENTOR
David Hoppenstand
By John R. Keller
his Attorney

Patented Dec. 14, 1937

2,102,268

UNITED STATES PATENT OFFICE 2,102,268

WINDSHIELD WIPER

David Hoppenstand, Pittsburgh, Pa.

Application April 2, 1935, Serial No. 14,251

2 Claims. (Cl. 185—37)

My invention relates to windshield wipers and, in particular to a windshield wiper for vehicles, which is motor driven.

I am aware that motor-driven windshield wipers have been known heretofore, including those driven by electric motors and those driven by pneumatic motors operating on the suction of the intake manifold of the vehicle engine. Neither of these types of wiper, however, has proved entirely satisfactory in operation; the suction type varies in certainty and speed of movement with the engine speed, and is apt to stop altogether when the engine is heavily loaded. The electric type is more certain in operation but constitutes a continuous drain on the vehicle battery while running, and is objectionable for that reason.

I have invented a motor driven windshield wiper which is independent of the engine speed and the vehicle battery, but at the same time is positive in operation, simple in construction, and highly effective for the intended purpose. In accordance with my invention, I provide a spring motor capable of being wound easily by hand, and adapted to be mounted at any convenient point around the edge of a vehicle windshield. The motor, through appropriate gearing and connections drives an arm which oscillates across the windshield in such manner as to remove accumulated rain drops, snow, and the like.

The details of construction characterizing the invention will become apparent as the following description of a present preferred embodiment thereof, illustrated in the accompanying drawings, proceeds, and the novel features will be particularly pointed out in the appended claims. In the drawings, Fig. 1 is an elevation showing the invention installed on a vehicle windshield;

Fig. 2 is an elevation of the casing enclosing the motor and drive;

Fig. 3 is an elevation similar to Fig. 2, with the cover of the casing removed;

Fig. 4 is a horizontal sectional view along the line IV—IV of Fig. 2;

Fig. 5 is a vertical sectional view along the line V—V of Fig. 2;

Fig. 6 is a partial sectional view, with parts in elevation, along the line VI—VI of Fig. 5;

Figure 7:
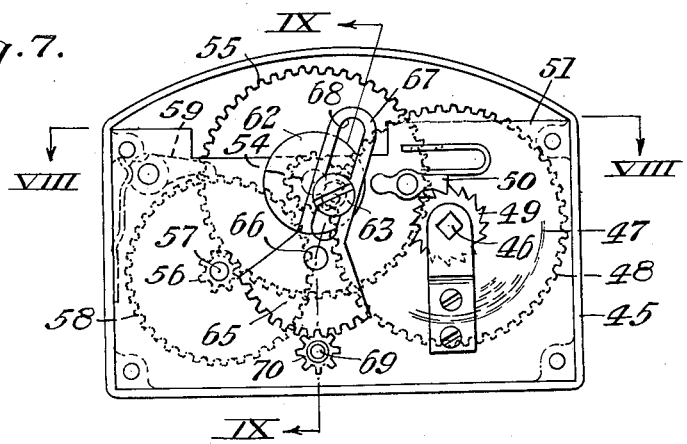
Fig. 7 is a view similar to Fig. 3, showing a modification.

Referring now in detail to the drawings and for the present to Figs. 1 through 6, the windshield wiper of my invention comprises a casing 10, containing the motor and drive, to be described in detail later, and adapted to be mounted in any convenient location on the windshield frame, and an oscillating wiper arm 11, extending from the casing for engaging and wiping a segment of the windshield surface when driven back and forth thereacross. The windshield is indicated at 12 and its frame at 13. The windshield may be that of any kind of vehicle, motor car, bus, truck or street car.

The casing 10 has top, bottom, side and rear walls and a removable cover 14, held thereon by screws 15. A winding shaft 16 extends through the rear wall and the cover and is provided with a square end adapted to receive a key 17. A spiral or clock spring 18 has one end secured to the shaft 16. The other end is attached to a driving gear 19 which is loose on the shaft 16. The shaft also has a ratchet wheel 20 on the square end thereof with which a spring pressed pawl 21 cooperates to prevent reversal of the shaft.

The gear 19 drives a pinion 22 fixed to an intermediate shaft 23 which is also journaled in bearings in the rear wall and cover of the casing. A gear 24 fixed on the shaft 23 drives a pinion 25 secured on a second intermediate shaft 26. A transverse shaft 27 is journaled in bearings in the side walls of the casing and is driven by the shaft 26 through a helical gear and pinion 28 and 29.

A barrel cam 30 having a sinuous groove 31 formed in the periphery thereof is mounted on the shaft 27. A crank 32 having an arm 33 and an arm 34 extending downwardly therefrom, is loose on the shaft 16. The arm 33 has a follower 35 adapted to lie within the groove 31. The arm 34 has a gear segment 36 thereon meshing with a pinion 37 on a shaft 38. The shaft 38 is parallel to the shaft 16 but extends through the rear wall of the casing and the frame of the windshield, and supports the wiper arm 11 as best shown in Fig. 5. This figure also shows one method of mounting the casing 10 on the inside of the windshield frame.

A detent 39 is mounted on the cover 14 and is movable to operative and inoperative positions by a knob 40. In the operative position, the detent engages the teeth of the gear 24 and prevents the drive from functioning. A spring 41 holds the detent in inoperative position when it is desired to operate the wiper.

The operation of the device will probably be understood from the foregoing description thereof but will be briefly reviewed for the sake of completeness. The spring 18 is first wound by turning the key 17, the detent 39 having been moved to the illustrated position. When the spring is wound sufficiently tightly, the detent may be withdrawn, releasing the driving gear train. As the spring unwinds, the gear 19 rotates, driving the pinion 22 and the shaft 23. The gear 24 similarly drives the pinion 25 and the shaft 26. The shaft 27 is driven therefrom through the helical gear and pinion 28 and 29. The resulting rotation of the barrel cam 30 causes oscillation of the arm 33 of the crank 32, and a corresponding movement of the arm 34. The oscillation of the gear segment 36 causes the pinion 37 to rotate back and forth, turning the shaft 38 and swinging the wiper arm 11 with it.

Because of the multiple gear reduction between the driving spring and the wiper shaft, the spring may be designed so as to drive the wiper for a considerable period on one winding. The wiper serves as a governor or escapement, the friction between the wiper and the windshield serving to limit the speed of the shaft 38 to the proper value. The motor drive is positive and assures continued oscillation of the wiper arm until the spring is unwound.

Figure 8:
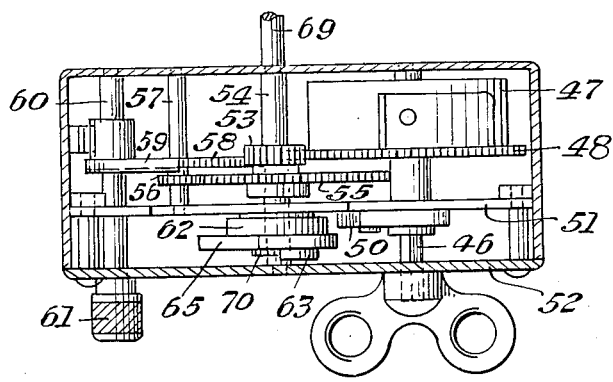
Fig. 8 is a view of the modification similar to Fig. 4.
Figure 9:
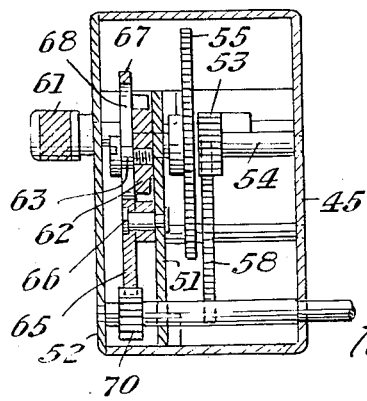
Fig. 9 is a view of the modification similar to Fig. 5.

A modified form of the invention illustrated in Figs. 7 through 9 includes a casing 45 having a spring winding shaft 46 therein. A spring 47 adapted to be wound by the shaft drives a gear 48, the shaft being held against unwinding by a ratchet and pawl 49 and 50. The ratchet 49 is carried on the shaft 46 and the pawl on a transverse plate 51 mounted in the casing parallel to the cover indicated at 52. The gear 48 drives a pinion 53 on a shaft 54. The shaft 54 has a gear 55 thereon driving a pinion 56 on a shaft 57. A gear 58 on the shaft 57 is adapted to be engaged by a detent 59 on a shaft 60 operable by a knob 61 to hold the drive against movement when operation of the wiper is not desired. The shaft 54 also has a crank disc 62 thereon provided with a crank pin 63. A gear segment 65 is pivoted to the plate 51 at 66. The segment has an extension 67 with a slot 68 for receiving the crank pin 63. A shaft 69 carries a pinion meshing with the segment 65. The pinion is shown at 70. The shaft 69 also carries the wiper arm which is not shown.

The operation of the device shown in Figs. 7 through 9 is similar to that of the device of Figs. 1 through 6. The rotation of the crank disc 62 causes the segment 65 to oscillate as the crank pin moves to and fro in the slot 68. As a result, the pinion 70 rotates back and forth and the wiper arm carried on the shaft 69 moves with it.

It will be apparent from the foregoing description that the invention provides a windshield wiper characterized by simplicity of construction, certainty of operation, and independence of the speed of the engine of the vehicle or the electrical system thereof. But little effort is required to wind the spring of the motor drive and the construction is such as to be practically immune from maintenance difficulties and failures in service. The invention, of course, may be embodied in forms other than those shown and described herein.

I claim:

1. A windshield wiper comprising an oscillatable shaft having a wiper arm thereon, an oscillatable gear segment for driving a pinion on said shaft, a barrel cam having its axis at right angles to said shaft and having a sinuous groove therein, a follower rigid with said segment cooperating with said groove, and a motor for driving said cam.

2. A windshield wiper comprising a motor, an oscillatable shaft having a wiper arm thereon, a power shaft disposed at right angles to said wiper shaft and having a barrel cam thereon, a pinion on the wiper shaft, and connections between the pinion and cam including a gear segment for engaging the pinion whereby uniform oscillatory movement proportional to the speed of the power shaft is transmitted to the wiper arm.

DAVID HOPPENSTAND.